(12) United States Patent
Washisu

(10) Patent No.: US 7,634,181 B2
(45) Date of Patent: Dec. 15, 2009

(54) IMAGE STABILIZING SYSTEM AND OPTICAL APPARATUS

(75) Inventor: Koichi Washisu, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 205 days.

(21) Appl. No.: 11/853,617

(22) Filed: Sep. 11, 2007

(65) Prior Publication Data

US 2008/0069552 A1    Mar. 20, 2008

(30) Foreign Application Priority Data

Sep. 14, 2006   (JP) .............................. 2006-249861

(51) Int. Cl.
    G03B 17/00    (2006.01)
    H04N 5/228    (2006.01)
(52) U.S. Cl. .................................... 396/55; 348/208.99
(58) Field of Classification Search .................. 396/52, 396/53, 54, 55; 348/208.99, 208.2, 208.3, 348/208.4, 208.12
    See application file for complete search history.

(56) References Cited

U.S. PATENT DOCUMENTS 6,035,132 A * 3/2000 Washisu et al. ............... 396/55
6,163,651 A * 12/2000 Washisu et al. ............... 396/55
7,400,824 B2 * 7/2008 Seo .............................. 396/55

FOREIGN PATENT DOCUMENTS

JP    7-225405 A    8/1995

* cited by examiner

Primary Examiner—Rodney E Fuller
(74) Attorney, Agent, or Firm—Canon U.S.A., Inc., I.P. Division

(57) ABSTRACT

An image stabilizing system performs rotational-shake correction to increase focus precision so that shift shake correction can be performed with high precision based on highly accurate image magnification information obtained by the high focus precision. The image stabilizing system includes a rotational-shake detecting unit that detects rotational shake occurring around a shooting light axis of an optical apparatus; a parallel-shake detecting unit that detects parallel shake occurring within a plane orthogonal to the light axis; a shake correcting unit that reduces image deterioration caused by the rotational shake and parallel shake; and an image stabilizing unit that actuates the shake correcting unit at an initial stage of a shake correcting process based on an output signal from the rotational-shake detecting unit, and actuates the shake correcting unit at a subsequent stage of the shake correcting process based on output signals from the rotational-shake detecting unit and the parallel-shake detecting unit.

12 Claims, 9 Drawing Sheets

IMAGE STABILIZING SYSTEM AND OPTICAL APPARATUS

BACKGROUND OF THE INVENTION

1. Field of the Invention

The present invention relates to image stabilizing systems having shake correcting units for correcting image shake caused by, for example, hand motion, and to optical apparatuses equipped with such image stabilizing systems.

2. Description of the Related Art

In recent cameras, the basic operations involved in performing a photographing operation, such as exposure setting and focusing, are completely automated. Therefore, even those unaccustomed to operating cameras are less likely to fail in taking a picture. Furthermore, in recent years, there has been researched a system for preventing image shake caused by hand motion. For these reasons, the user rarely fails in taking a satisfactory picture.

Such an image-shake preventing system will be described briefly below.

Hand motion occurring when taking a picture with a camera is normally a vibration with a frequency of 1 Hz to 10 Hz. When hand motion occurs at the point of releasing of the shutter, the picture to be taken is prevented from blurring basically by detecting the vibration of the camera caused by the hand motion, and then shifting a correction lens in accordance with the detected value. Consequently, in order to take a picture without blurring even in the case of camera shake, it is necessary to accurately detect the vibration of the camera and to accurately compensate for the displacement of the light axis caused by the hand motion.

The detection of vibration (camera shake) is basically achieved by equipping the camera with a vibration detector. Specifically, a vibration detector detects, for example, an acceleration, angular acceleration, angular velocity, and angular displacement and appropriately implements arithmetic processing on the output values to compensate for the camera shake. On the basis of the detected information, a shake correcting unit is driven to decenter the shooting light axis, thereby reducing image shake.

FIG. 9A is a plan view of a single-lens reflex camera, and FIG. 9B is a side view of the camera.

This single-lens reflex camera has an interchangeable lens 80 attached thereto, which is equipped with an image stabilizing system. The image stabilizing system corrects image shake occurring from pitch shake and yaw shake of the camera, indicated with respective arrows 82$p$ and 82$y$, with respect to a light axis 81. A camera body 83 has a release member 83$a$, a mode dial 83$b$ (including a main switch), a retractable strobe 83$c$, and a camera central processing unit (CPU) 83$d$.

In FIGS. 9A and 9B, reference numeral 84 denotes an image pickup element, and reference numeral 85 denotes a shake correcting mechanism that corrects image shake in the direction of the arrows 82$p$ and 82$y$ by freely driving a correction lens 86 in directions indicated by arrows 85$p$ and 85$y$. Reference numerals 86$p$ and 86$y$ denote angular velocity meters that detect shake occurring in the directions of the arrows 82$p$ and 82$y$. Arrows 86$pa$ and 86$ya$ indicate detection sensitivity directions. Output signals from the angular velocity meters 86$p$ and 86$y$ are arithmetically processed at the CPU 87 and are converted to target shake-correction values for the shake correcting mechanism 85.

In synchronization with half pressing of the release member 83$a$ provided on the camera body 83 (which is performed for instructing photometry and focusing to prepare for a photographing operation), the target shake-correction values are input to a coil of the shake correcting mechanism 85 via a driving unit 88. Subsequently, an image-shake correcting operation begins.

In the image stabilizing system described with reference to FIGS. 9A and 9B, the angular velocity meters 86$p$ and 86$y$ are used for shake detection. The camera body 83 not only receives rotational shake in the directions of the arrows 82$p$ and 82$y$ shown in FIGS. 9A and 9B, but also receives parallel shake indicated by arrows 11$pb$ and 11$yb$. However, in normal photographing conditions, the rotational shake in the directions of the arrows 82$p$ and 82$y$ has much more effect on the image than the parallel shake in the directions of the arrows 11$pb$ and 11$yb$, since the effect of the parallel shake is small. For this reason, only the angular velocity meters 86$p$ and 86$y$ are required for the shake detection.

However, when a photographing operation is implemented at close range (i.e. a photographing condition with high shooting magnification), the effect the parallel shake in the directions of the arrows 11$pb$ and 11$yb$ (which will be referred to as "shift shake" hereinafter) has on the image is not negligible. For example, when an object is to be photographed at close range of about 20 cm, as in macro photography, or when the focal length of a photographic optical system is extremely large (such as 400 mm) and an object is positioned about 1 m from the camera, it becomes necessary to actively detect shift shake and to drive a shake correcting device.

Japanese Patent Laid-Open No. 7-225405 discloses a technology in which an accelerometer for detecting an acceleration is provided so as to detect shift shake on the basis of the detected acceleration. A shake correcting device is driven on the basis of the detected shift shake and an output value from a separately provided angular velocity meter.

As disclosed in Japanese Patent Laid-Open No. 7-225405, the necessity of shift shake correction depends on the shooting magnification. The shooting magnification is generally determined from, for example, how much a lens unit is extended when focused on an object. In other words, a shift shake cannot be corrected until the camera is focused on the object. However, in the case of a large hand motion, the focus precision becomes deteriorated. This not only makes it difficult to attain satisfactory focus precision, but also leads to lower accuracy for calculating the amount of shift shake on the basis of the necessity of the shift shake correction and the shooting magnification.

SUMMARY OF THE INVENTION

The present invention provides an image stabilizing system that properly corrects a rotational shake to increase the focus precision so that shift shake correction can be performed with high precision on the basis of highly accurate image magnification information obtained as a result of the high focus precision. The present invention also provides an optical apparatus equipped with such an image stabilizing system.

An image stabilizing system according to an aspect of the present invention includes a rotational-shake detecting unit configured to detect rotational shake occurring in an optical apparatus, the rotational shake occurring around a shooting light axis of the optical apparatus; a parallel-shake detecting unit configured to detect parallel shake occurring in the optical apparatus, the parallel shake occurring within a plane extending orthogonal to the shooting light axis; a shake correcting unit configured to reduce image deterioration caused by the rotational shake and the parallel shake; and an image stabilizing unit configured to actuate the shake correcting unit at an initial stage of a shake correcting process on the basis of an output signal from the rotational-shake detecting unit, and to actuate the shake correcting unit at a subsequent stage of the shake correcting process on the basis of the output signal from the rotational-shake detecting unit and an output signal from the parallel-shake detecting unit.

An image stabilizing system according to another aspect of the present invention includes a rotational-shake detecting unit configured to detect rotational shake occurring in an optical apparatus, the rotational shake occurring around a shooting light axis of the optical apparatus; a parallel-shake detecting unit configured to detect parallel shake occurring in the optical apparatus, the parallel shake occurring within a plane extending orthogonal to the shooting light axis; a shake correcting unit configured to reduce image deterioration caused by the rotational shake and the parallel shake; and an image stabilizing unit configured to control a mixing ratio between an output signal from the rotational-shake detecting unit and an output signal from the parallel-shake detecting unit in accordance with elapsed time after a start of a shake correcting process when the image stabilizing unit actuates the shake correcting unit to perform the shake correcting process on the basis of the output signals from the rotational-shake detecting unit and the parallel-shake detecting unit.

An optical apparatus according to another aspect of the present invention includes the image stabilizing system according to one of the above aspects of the invention.

Further features of the present invention will become apparent from the following description of exemplary embodiments with reference to the attached drawings.

DESCRIPTION OF THE EMBODIMENTS

Embodiments of the present invention will be described in detail with reference to the accompanying drawings.

The embodiments include first to fourth embodiments to be described hereinafter.

First Embodiment

Figure 1A:
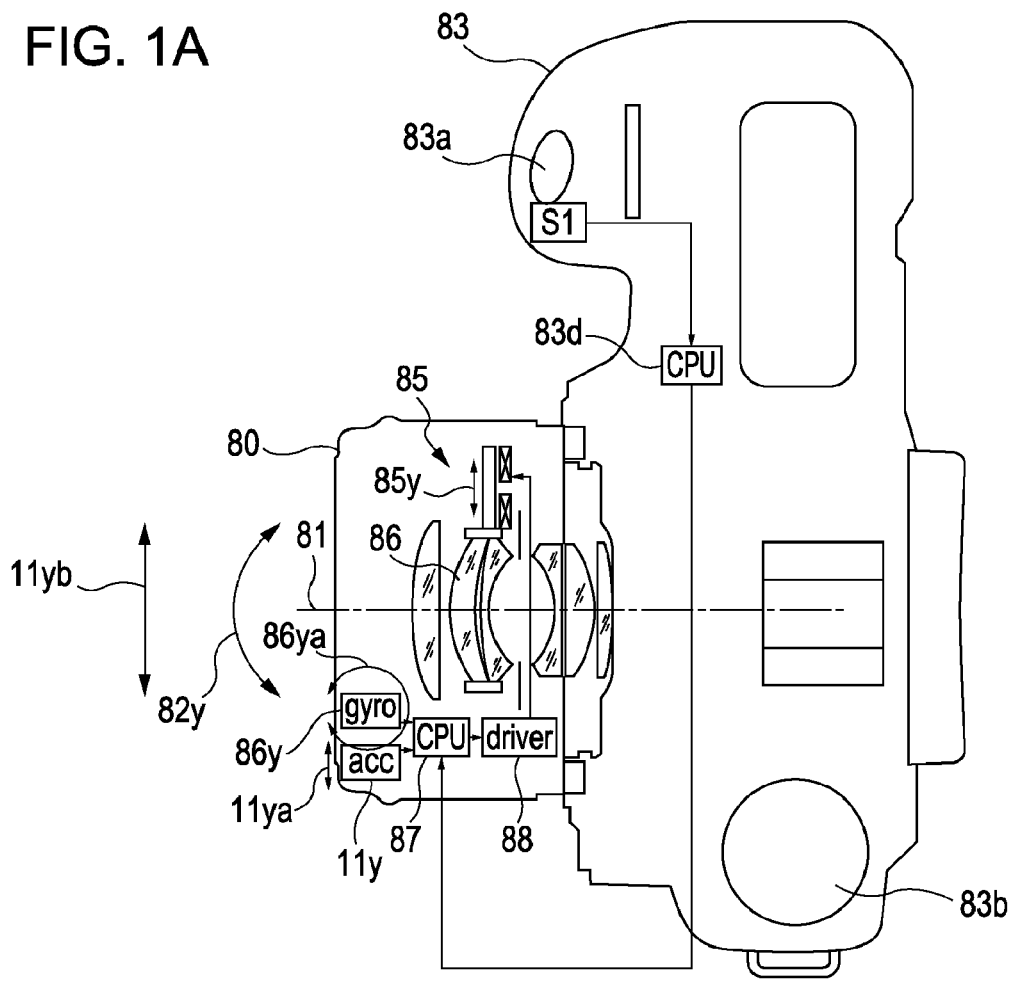
FIGS. 1A and 1B are a cross-sectional top view and a cross-sectional side view of a single-lens reflex camera according to a first embodiment of the present invention.
Figure 1B:
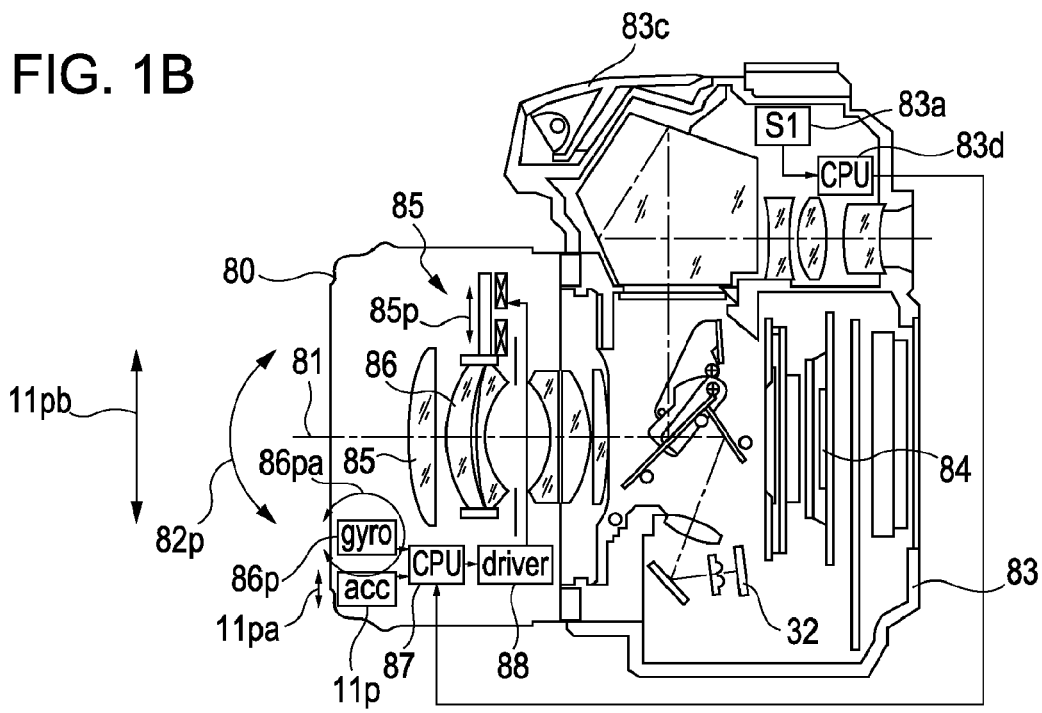
Figure 9A:
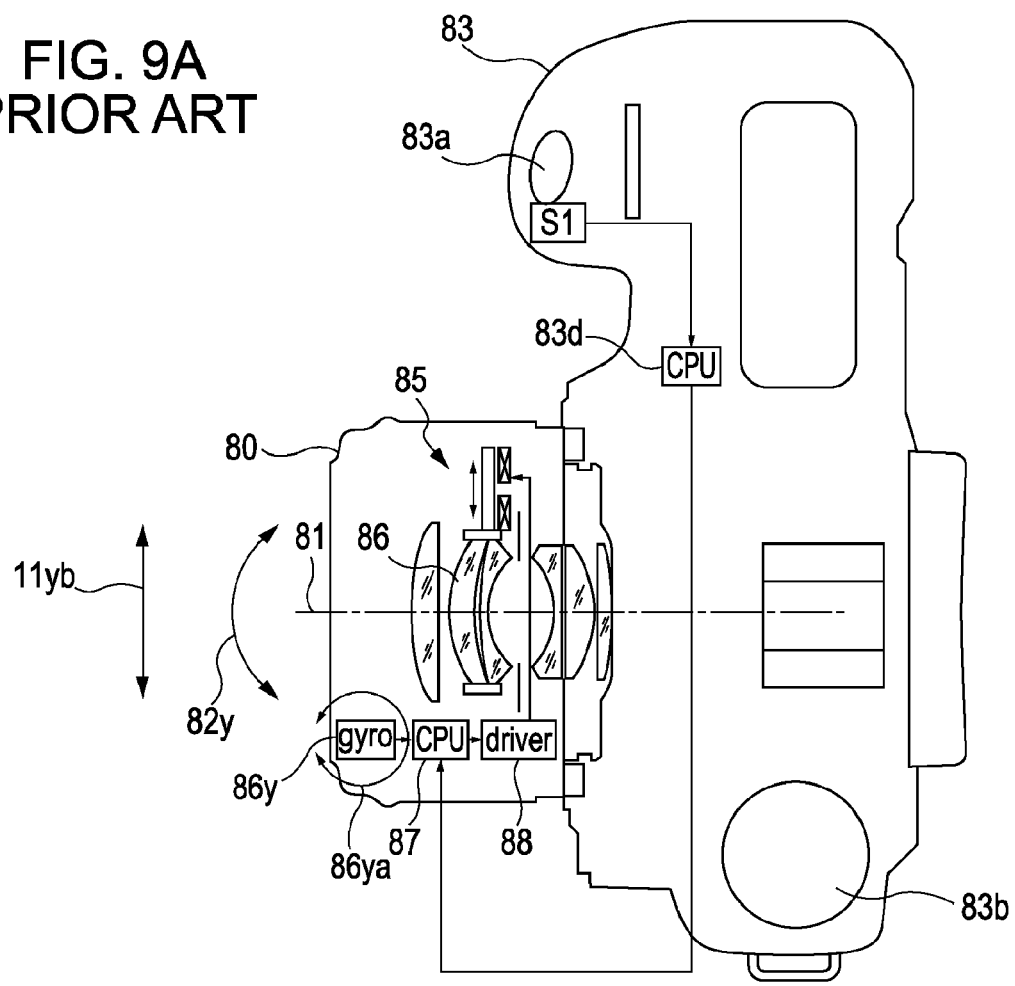
FIGS. 9A and 9B are a top view and a side view of a single-lens reflex camera of related art.
Figure 9B:
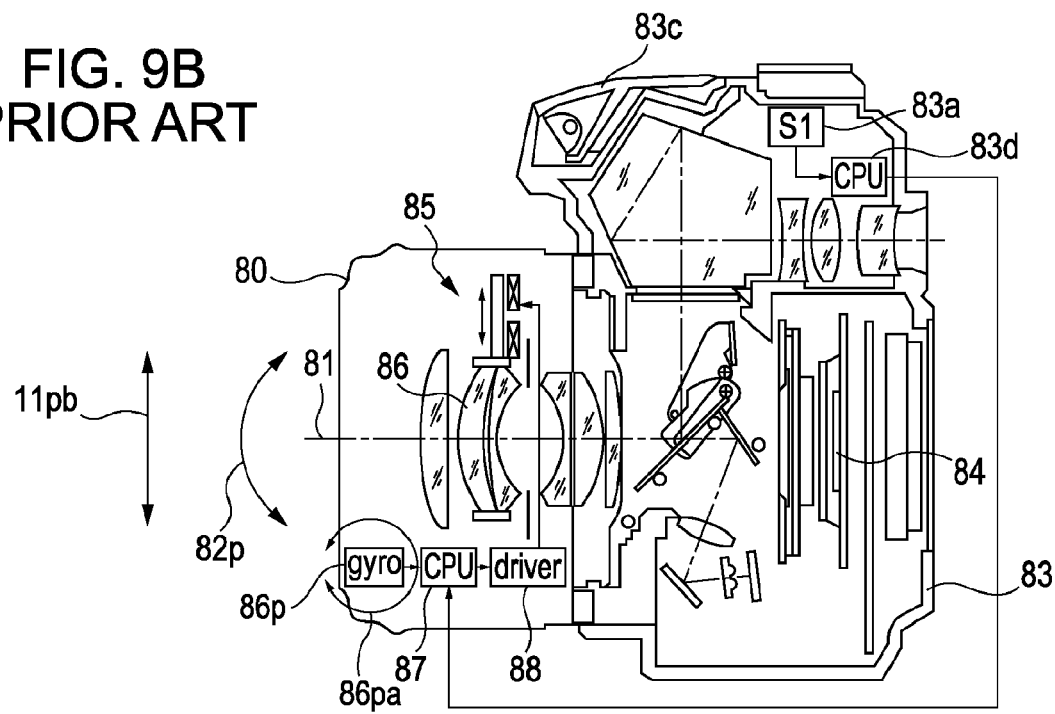

FIGS. 1A and 1B are a cross-sectional plan view and a cross-sectional side view of a single-lens reflex camera according to a first embodiment of the present invention. The single-lens reflex camera of the first embodiment of the invention differs from that of the related art shown in FIGS. 9A and 9B in having accelerometers $11p$ and $11y$. The acceleration detection axes of the accelerometers $11p$ and $11y$ are aligned with the arrows $11pa$ and $11ya$ shown in FIGS. 1A and 1B. The arrows $11pb$ and $11yb$ indicate shift shake in the corresponding directions.

Figure 2:
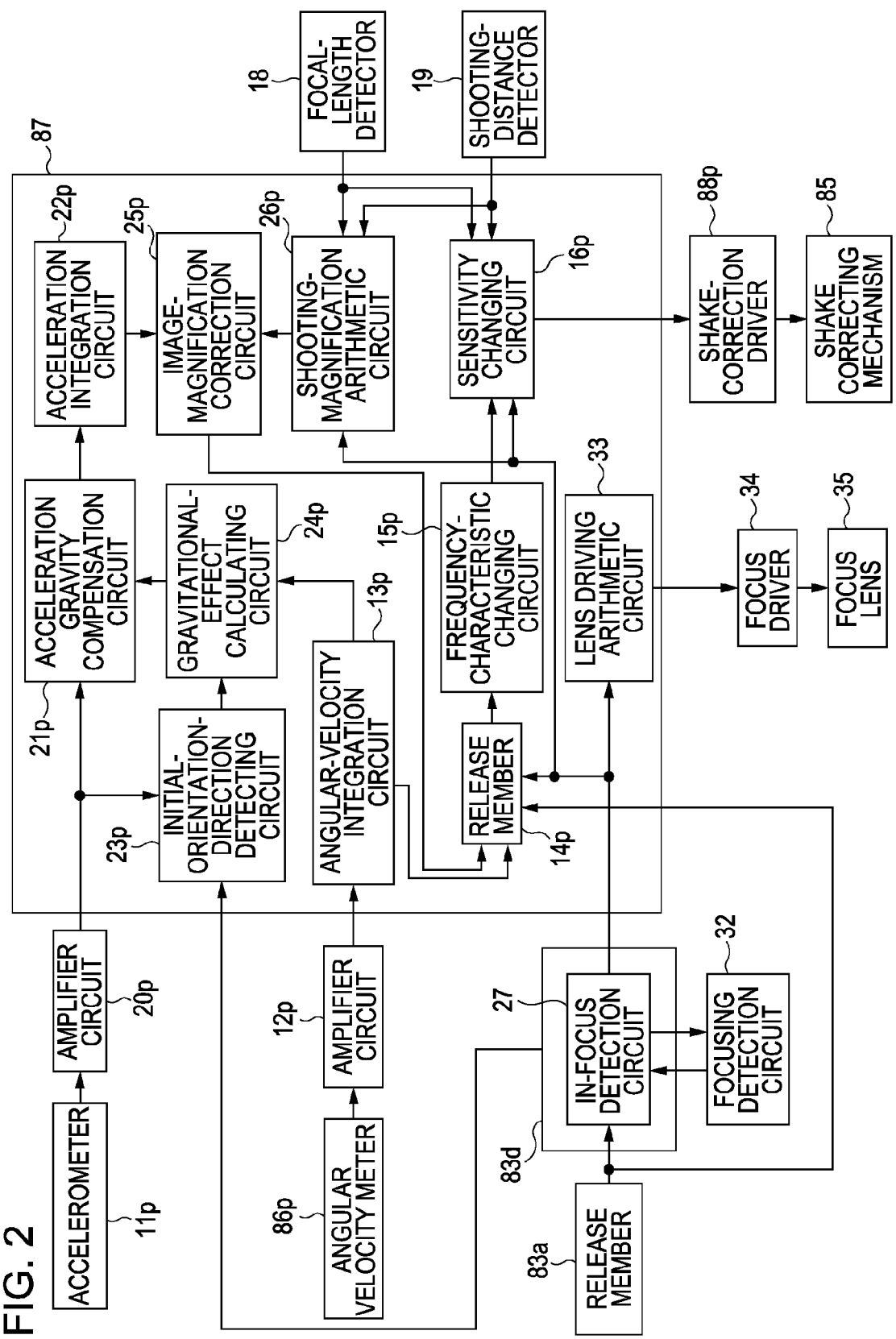
FIG. 2 is a block diagram showing a circuit configuration of the single-lens reflex camera according to the first embodiment of the present invention.

FIG. 2 is a block diagram that includes a circuit that processes signals of shift shake detected by the accelerometers $11p$ and $11y$ and signals of rotational shake detected by angular velocity meters $86p$ and $86y$. The processing of these signals is implemented within a lens microcomputer (CPU) $87$. FIG. 2 only shows signal processing for alleviating image shake caused by pitch shake of the camera (i.e. rotational shake corresponding to arrow $82p$ in FIG. 1B and shift shake corresponding to arrow $11pb$ in FIG. 1B). However, in the actual camera, signal processing for alleviating image shake caused by yaw shake (i.e. rotational shake corresponding to arrow $82y$ in FIG. 1A and shift shake corresponding to arrow $11yb$ in FIG. 1A) is similarly implemented.

In FIG. 2, a shake angular-velocity signal of the angular velocity meter $86p$ is input to an amplifier circuit $12p$. The amplifier circuit $12p$ not only amplifies the output signal from the angular velocity meter $86p$, but also performs DC removal for removing a DC component superimposed on the angular velocity meter $86p$ and high-pass attenuation for removing a high-frequency noise component. The output signal from the amplifier circuit $12p$ is A/D (analog-to-digital) converted and is received by the lens microcomputer $87$. The signal received is numerically processed in the lens microcomputer $87$, but the process is shown in separate blocks for descriptive purposes.

The shake angular-velocity signal received by the lens microcomputer $87$ is input to an angular-velocity integration circuit $13p$ within the lens microcomputer $87$. At the angular-velocity integration circuit $13p$, a high-frequency component of approximately 0.1 Hz or higher in the shake angular-velocity signal is first-order integrated and is converted to a shake angle signal. At the starting point of the integration, the integral band is made narrow (for example, integrating only components with 1 Hz or higher) so as to advance the start of the signal processing. This switching of the integral band will be referred to as time constant switching hereinafter.

The shake angle signal is input to an adding circuit $14p$ where the signal is combined with a shake displacement signal to be described below so as to be converted to a total shake signal. Specifically, the adding circuit $14p$ combines the shake angle signal and the shake displacement signal together on the basis of signals from the release member $83a$ and an in-focus detection circuit $27$. In detail, the adding circuit $14p$ receives the shake angle signal in response to an ON signal of a switch S1 (control switch for photometry and focusing), which is turned on by half pressing of the release member $83a$, and combines the shake displacement signal and the shake angle signal together on the basis of a signal (indicating that the focusing is completed) received from the in-focus detection circuit $27$.

The total shake signal is input to a frequency-characteristic changing circuit $15p$ where the frequency characteristics are changed. The frequency-characteristic changing circuit $15p$ mainly attenuates a low-frequency component of the total shake signal, and determines which frequency level (for example, 0.1 Hz and lower or 5 Hz and lower) frequencies are to be attenuated down from. Thus, the corresponding signal components are attenuated. In detail, when a large hand motion occurs, as in a change in the framing of the camera, the total shake signal is attenuated by a large amount (for example, signals with 5 Hz and lower are attenuated). In that case, a shake correction is not implemented. In other words, if the frequency-characteristic changing circuit $15p$ is not provided, the framing component of the camera will undesirably be subject to shake correction. Thus, the frequency-characteristic changing circuit $15p$ allows for favorable framing of the camera and prevents such undesirable shake correction.

The output signal from the frequency-characteristic changing circuit $15p$ is input to a sensitivity changing circuit $16p$. The sensitivity changing circuit $16p$ receives signals from a focal-length detector 18 and a shooting-distance detector 19 (i.e. zoom information and shooting-distance information) input to the lens microcomputer 87, and changes an amplification factor of the signal from the frequency-characteristic changing circuit $15p$.

Generally, a shake-correction optical system (corresponding to the correction lens 86) contained in a zoom lens changes its shake-correction sensitivity depending on whether the system is in a zoom state or a focus state. For example, if the shake-correction optical system is driven by 1 mm at the zoom wide-angle end, the image at the image plane is similarly shifted by 1 mm. In that case, when the shake-correction optical system is driven by 1 mm at the zoom telephoto end, the image at the image plane is shifted by 3 mm. Likewise, the relationship between the driving amount of the shake-correction optical system and the image displacement amount is different when an object is at an infinity end and a close end. Therefore, in order to correct the sensitivity (for example, setting the amplification factor to one-third at the telephoto end), the amplification factor of the signal from the frequency-characteristic changing circuit $15p$ is changed in accordance with the zoom information and the shooting-distance information.

The focal-length detector 18 is provided in the interchangeable lens 80 and includes, for example, an encoder that detects the position of a zoom lens. The focal-length detector 18 detects a focal length and outputs the detected information as zoom information. The shooting-distance detector 19 is also provided in the interchangeable lens 80 and includes, for example, an encoder that detects the position of a focus lens. The shooting-distance detector 19 detects a shooting distance and outputs the detected information as shooting-distance information.

When the release member 83a is half-pressed to prepare for a photographing operation, the switch S1 is turned on. Subsequently, a target shake-correction signal from the sensitivity changing circuit $16p$ is converted to a PWM signal, and the signal is input to a shake-correction driver $88p$. The shake-correction driver $88p$ drives the shake correcting mechanism 85 in accordance with the PWM signal so as to perform shake correction. Since the adding circuit $14p$ only has a shake angle signal at this time, the shake correction is performed only for rotational shake. Furthermore, in response to the ON signal from the switch S1, the in-focus detection circuit 27 in the camera microcomputer $83d$ drives a focusing detection circuit 32 in the camera body 83 so as to detect the focus condition of the object.

A lens driving arithmetic circuit 33 to which a focus displacement amount is sent calculates the driving amount of a focus lens 35 on the basis of the focus displacement amount. This driving amount is output to a focus driver 34, which drives the focus lens 35. In this case, the rotational shake is corrected while the focusing operation is being performed so that the focusing operation can be implemented with high precision.

After the focus lens 35 is driven, the focus condition of the object is detected again at the focusing detection circuit 32. In this case, if a satisfactory focus condition is attained, a display device (not shown) displays a message indicating the in-focus state. In the case of an unsatisfactory focus condition, the focus lens 35 is driven again. Moreover, when a satisfactory focus condition is attained, the in-focus detection circuit 27 allows the adding circuit $14p$ to add the shake displacement signal to the shake angle signal.

The shooting distance (extension amount) information of the focus lens 35 is constantly input to the sensitivity changing circuit $16p$. In the sensitivity changing circuit $16p$, the shooting distance of the focus lens 35 at the time when the in-focus state is detected at the in-focus detection circuit 27 via the focusing detection circuit 32 is referred to as a vibration control sensitivity value.

Based on the relationship between the shooting distance of the focus lens 35 and the position of the zoom lens, a shooting-magnification arithmetic circuit $26p$ calculates the image magnification. The calculation of the image magnification also starts in response to the detection of the in-focus state by the in-focus detection circuit 27. In other words, at the time when the zoom is determined (assuming the zoom is determined prior to the ON signal from the switch S1) and the camera is focused on the object and the shooting distance of the focus lens 35 is confirmed, the sensitivity for image-shake correction can be determined. Subsequently, a target shake-correction value is calculated. The image magnification is also determined at the time when the camera is focused on the object.

The target shake-correction value obtained in the above-described manner is converted to a PWM signal, which is then input to the shake-correction driver $88p$. The shake-correction driver $88p$ drives the shake correcting mechanism 85 in accordance with the input PWM signal. Consequently, the correction lens 86 implements image-shake correction. In other words, shift-shake correction is also implemented at the time when the focusing operation is completed.

Signal processing of the accelerometer $11p$ will be described. A shake acceleration signal from the accelerometer $11p$ is input to an amplifier circuit $20p$. The amplifier circuit $20p$ not only amplifies the output signal from the accelerometer $11p$, but also performs DC removal for removing a DC component superimposed on the accelerometer $11p$ and high-pass attenuation for removing a high-frequency noise component. The output signal (shake acceleration signal) from the amplifier circuit $20p$ is A/D converted and is received by the lens microcomputer 87. The shake acceleration signal received is numerically processed in the lens microcomputer 87, but the process is shown in separate blocks for descriptive purposes.

The shake acceleration signal received by the lens microcomputer 87 is input to an acceleration gravity compensation circuit $21p$ within the lens microcomputer 87. In the acceleration gravity compensation circuit $21p$, a gravity component is compensated.

The necessity of the gravity-component compensation will be described below.

Figure 3A:
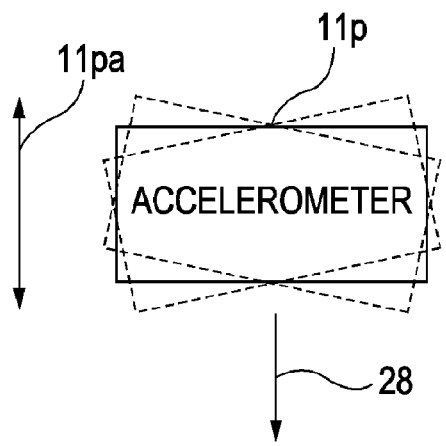
FIGS. 3A to 3C illustrate gravitational errors imparted on accelerometers and gravitational errors due to a shake angle in the single-lens reflex camera according to the first embodiment of the present invention.

The shooting position (orientation) of the camera in FIG. 1B is horizontal. Therefore, a sensitivity direction $11pa$ of the accelerometer $11p$ is the same as a gravitational direction 28, as shown in FIG. 3A. In this case, the accelerometer $11p$ constantly outputs a signal corresponding to the gravity component, and a shift-shake component is detected simultaneously with the output of the signal. Because the output signal corresponding to the gravity component is a DC component, the DC component can be removed at, for example, a DC removing circuit equipped in the amplifier circuit $20p$. However, referring to the dotted line in FIG. 3A, the position of the accelerometer $11p$ changes in accordance with a change in the rotational angle of shake occurring when the camera is being held. Thus, the gravitational direction 28 changes as viewed from the accelerometer $11p$. Therefore, the output signal from the accelerometer $11p$ changes in accordance with the change in the shake angle.

Figure 3B:
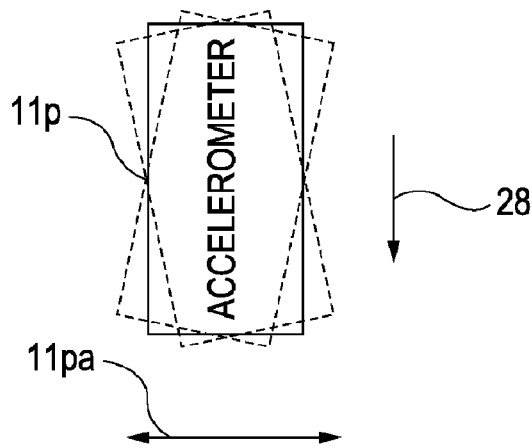
Figure 3C:
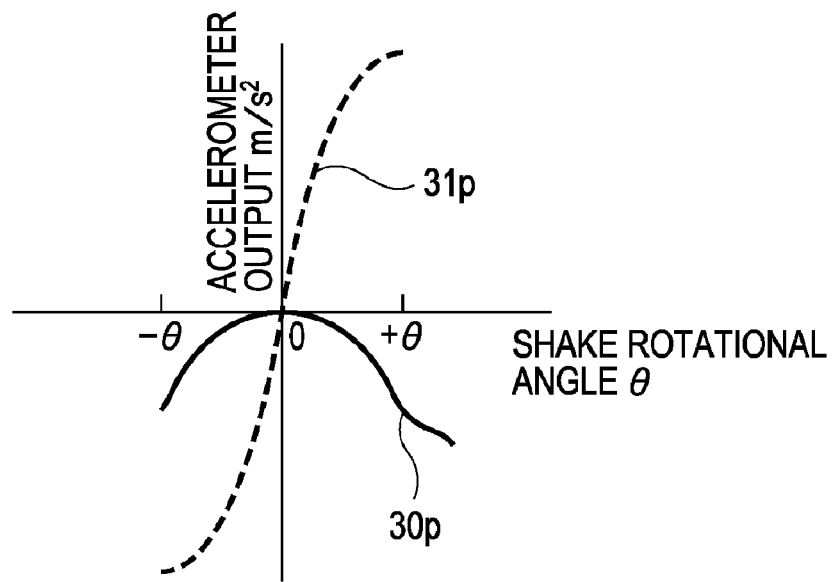

FIG. 3C illustrates a change in the output signal from the accelerometer $11p$ with respect to the orientation of the accelerometer $11p$. The abscissa axis indicates the change in the orientation of the accelerometer $11p$ (shake rotational angle θ), and the ordinate axis indicates the output signal from the accelerometer $11p$. A waveform $30p$ indicates the output of the accelerometer $11p$. When the orientation angle of the accelerometer $11p$ changes from zero (i.e. a state where 1 G is applied as shown with the solid line in FIG. 3A) to ±θ, the output signal from the accelerometer $11p$ changes (decreases) accordingly.

Figure 4:
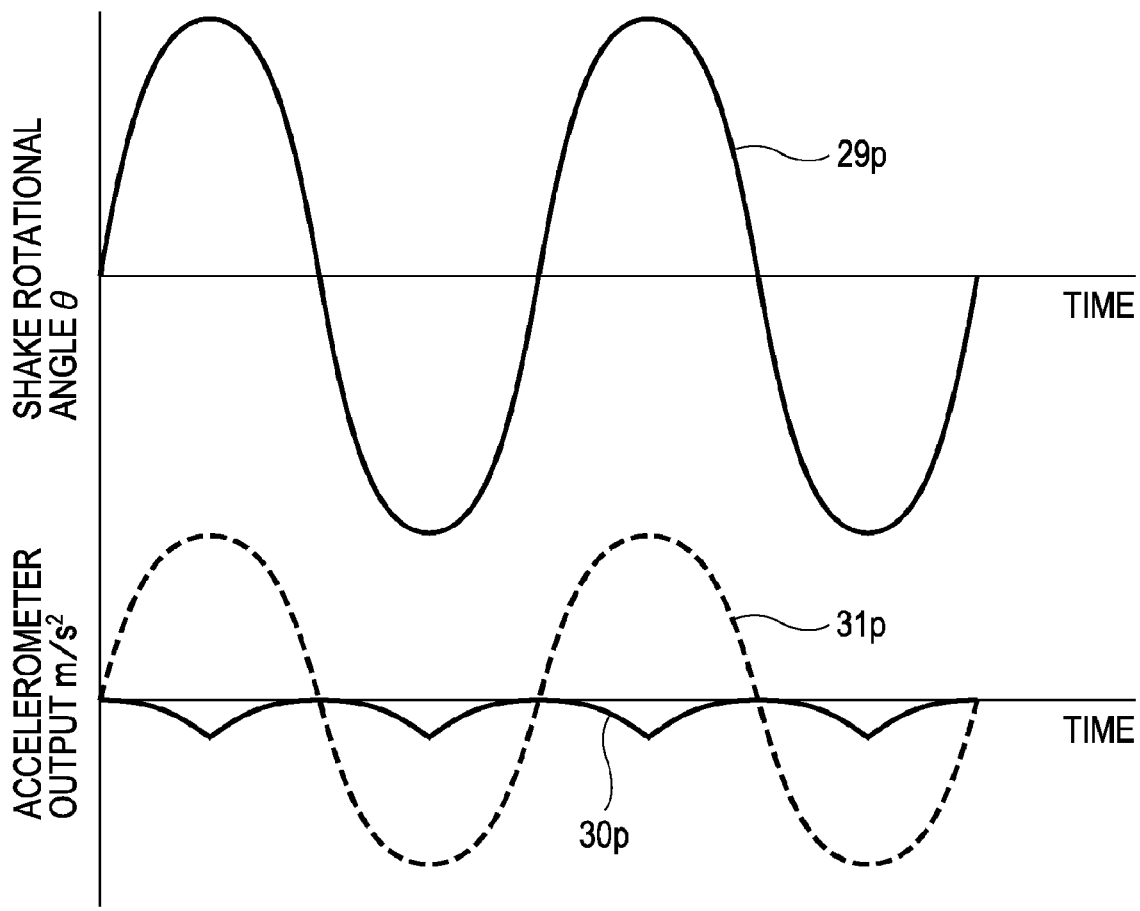
FIG. 4 illustrates a change in the output of the accelerometers shown in FIG. 2 in accordance with a change in gravity.

FIG. 4 illustrates a change in the output of the accelerometer $11p$ in accordance with a change in gravity. The abscissa axis indicates the time elapsed from when the camera is held, and the ordinate axis indicates the shake angle and the output from the accelerometer $11p$.

Even if it is assumed that there is no occurrence of a shift shake, the accelerometer $11p$ still outputs an error signal $30p$ due to the effect of a change in the gravity component in accordance with a shake rotational angle $29p$. When performing close-range photography, there are often cases where the camera is used facing downward. FIG. 3B is an example that corresponds to such cases, in which a sensitivity direction $11pa$ of the accelerometer $11p$ is orthogonal to the gravitational direction 28. In this case, an error signal corresponds to the dotted line $31p$ in FIG. 3C and FIG. 4.

As shown in FIG. 4, there is a significant difference in the magnitude of the error signals $30p$ and $31p$ between the orientation of the accelerometer $11p$ shown in FIG. 3A and the orientation of the accelerometer $11p$ shown in FIG. 3B. With the orientation in FIG. 3A, the gravity has an effect in the cosine direction with respect to a change in the shake angle, whereas with the orientation in FIG. 3B, the gravity has an effect in the sine direction. This is because when there is a small change in the angle of the orientation, the change in the sine direction is greater. Therefore, in order to compensate for the effect of the gravity, it is necessary to detect the shake angle and to know the orientation of the accelerometer $11p$ (that is, to know what angle the sensitivity axis is at with respect to the gravity as in the difference between FIG. 3A and FIG. 3B).

Referring to FIG. 2, when the camera is aimed at the object and is ready for a photographing operation, the release member $83a$ is half-pressed so that the switch S1 is turned on. Then, based on an instruction from the camera microcomputer $83d$, photometry and focusing operations with respect to the object begin. At the same time, the ON signal from the switch S1 is input to an initial-orientation-direction detecting circuit $23p$ in the lens microcomputer 87 via the camera microcomputer $83d$. The initial-orientation-direction detecting circuit $23p$ also receives an acceleration signal amplified by the amplifier circuit $20p$. The initial-orientation-direction detecting circuit $23p$ determines the orientation of the accelerometer $11p$ on the basis of the magnitude of the acceleration signal at the time when the ON signal is received from the switch S1.

The half-pressing of the release member $83a$ for turning on the switch S1 is an operation that is performed after the user has framed the object to be photographed. For this reason, there is no significant change in the orientation of the camera after the half-pressing of the release member $83a$. Consequently, determining the orientation of the accelerometer $11p$ on the basis of the input of the ON signal from the switch S1 is effective. Alternatively, the orientation determination may be implemented after the focusing operation on the object has been completed following the ON signal from the switch S1. In that case, however, it becomes difficult to integrate the output signal from the accelerometer $11p$ utilizing the time between the turning on of the switch S1 and the focusing operation. Therefore, to save time, it is more preferable to determine the orientation of the accelerometer $11p$ at the time when the switch S1 is turned on.

If the magnitude of the acceleration is 1 G at the time when the ON signal from the switch S1 is received, the initial-orientation-direction detecting circuit $23p$ determines that the accelerometer $11p$ is oriented as shown in FIG. 3A. If the magnitude is 0 G, the initial-orientation-direction detecting circuit $23p$ determines that the accelerometer $11p$ is oriented as shown in FIG. 3B. If the magnitude of the acceleration is between the above two values, the initial-orientation-direction detecting circuit $23p$ determines that the accelerometer $11p$ is at the corresponding orientation.

The shake angle signal from the angular-velocity integration circuit $13p$ is not only received by the adding circuit $14p$, but also by a gravitational-effect calculating circuit $24p$. The gravitational-effect calculating circuit $24p$ calculates a change in the gravity superimposed on the accelerometer $11p$ on the basis of a change in the shake angle. In this case, as described above, the calculation method (sine calculation or cosine calculation) changes depending on the orientation of the accelerometer $11p$ with respect to the gravity. Therefore, the signal from the initial-orientation-direction detecting circuit $23p$ is also input to the gravitational-effect calculating circuit $24p$, and the coefficient for the calculation is different between the orientation shown in FIG. 3A and the orientation shown in FIG. 3B.

In detail, referring to FIG. 3A, assuming that orientation φ of the camera when receiving 1 G is zero degrees and a change in the orientation is θ, a change in the output from the accelerometer $11p$ is determined from the following expression:

$$G(\cos \phi - \cos(\phi + \theta)).$$

Here, φ is determined at the initial-orientation-direction detecting circuit $23p$ and θ is determined from the shake angle, and these values are used at the gravitational-effect calculating circuit $24p$ for calculating the gravitational effect.

The shake acceleration signal amplified at the amplifier circuit $20p$ is input to the acceleration gravity compensation circuit $21p$. The acceleration gravity compensation circuit $21p$ calculates a difference between the gravity change determined at the gravitational-effect calculating circuit $24p$ and the signal change of the accelerometer $11p$, so as to remove an output error of the accelerometer $11p$ caused by the gravitational effect. The shake acceleration signal with the error component removed therefrom in the above-described manner is input to an acceleration integration circuit $22p$. The acceleration integration circuit $22p$ second-order integrates the shake acceleration signal, which is received from the acceleration gravity compensation circuit $21p$ and compensated for the gravitational effect, and converts the signal to a shake displacement signal. Similar to the angular-velocity integration circuit $13p$, the acceleration integration circuit 22$p$ second-order integrates a high-frequency component of approximately 0.1 Hz or higher in the shake acceleration signal, and converts the signal to a shake displacement signal. At the starting point of the integration, the integral band is made narrow (for example, integrating only components with 1 Hz or higher) so as to advance the start of the signal processing (time constant switching).

The shake displacement signal from the acceleration integration circuit 22$p$ is input to an image-magnification correction circuit 25$p$. The shooting-magnification arithmetic circuit 26$p$ calculates the shooting magnification on the basis of the zoom information from the focal-length detector 18 and the shooting-distance information from the shooting-distance detector 19. As described above, the focal-length detector 18 is provided within the interchangeable lens 80 and includes, for example, an encoder that detects the position of the zoom lens. The focal-length detector 18 detects a focal length and outputs the detected information as zoom information. The shooting-distance detector 19 is also provided in the interchangeable lens 80 and includes, for example, an encoder that detects the position of the focus lens. The shooting-distance detector 19 detects a shooting distance and outputs the detected information as shooting-distance information. After the extension of the focus lens 35 is completed and the in-focus detection circuit 27 confirms an in-focus state, the shooting-magnification arithmetic circuit 26$p$ calculates the shooting magnification on the basis of the output signals from the focal-length detector 18 and the shooting-distance detector 19.

The shift shakes indicated by the arrows 11$pb$ and 11$yb$ have a significant effect on the screen when the object is close and the shooting distance and the focal length are large (when the shooting magnification is high). On the other hand, when the object is far (when the shooting magnification is low), the shift shakes indicated by the arrows 11$pb$ and 11$yb$ have substantially no effect on the screen. Therefore, the shake displacement (shift shake) signals detected by the accelerometers 11$p$ and 11$y$ and calculated need to be amplified in accordance with the shooting magnification so as to be target shake-correction values.

The image-magnification correction circuit 25$p$ amplifies each shake displacement signal from the acceleration integration circuit 22$p$ on the basis of the calculated value of the shooting-magnification arithmetic circuit 26$p$ (which determines that the shooting magnification is high when the focal length is large and the object is near). The adding circuit 14$p$ combines the signal from the angular-velocity integration circuit 13$p$ and the signal from the image-magnification correction circuit 25$p$ (signal based on the acceleration integration circuit 22$p$) together. However, when the object is far and the shooting distance and the focal length are small, the output signal from the angular-velocity integration circuit 13$p$ is substantially the only signal that is output.

The output signal from the adding circuit 14$p$ becomes a target shake-correction value via the frequency-characteristic changing circuit 15$p$ that facilitates the change in the framing of the camera and via the sensitivity changing circuit 16$p$ that adjusts the effectiveness of the shake correction in accordance with the sensitivity of the optical system, whereby the shake correcting mechanism 85 is driven.

Figure 5:
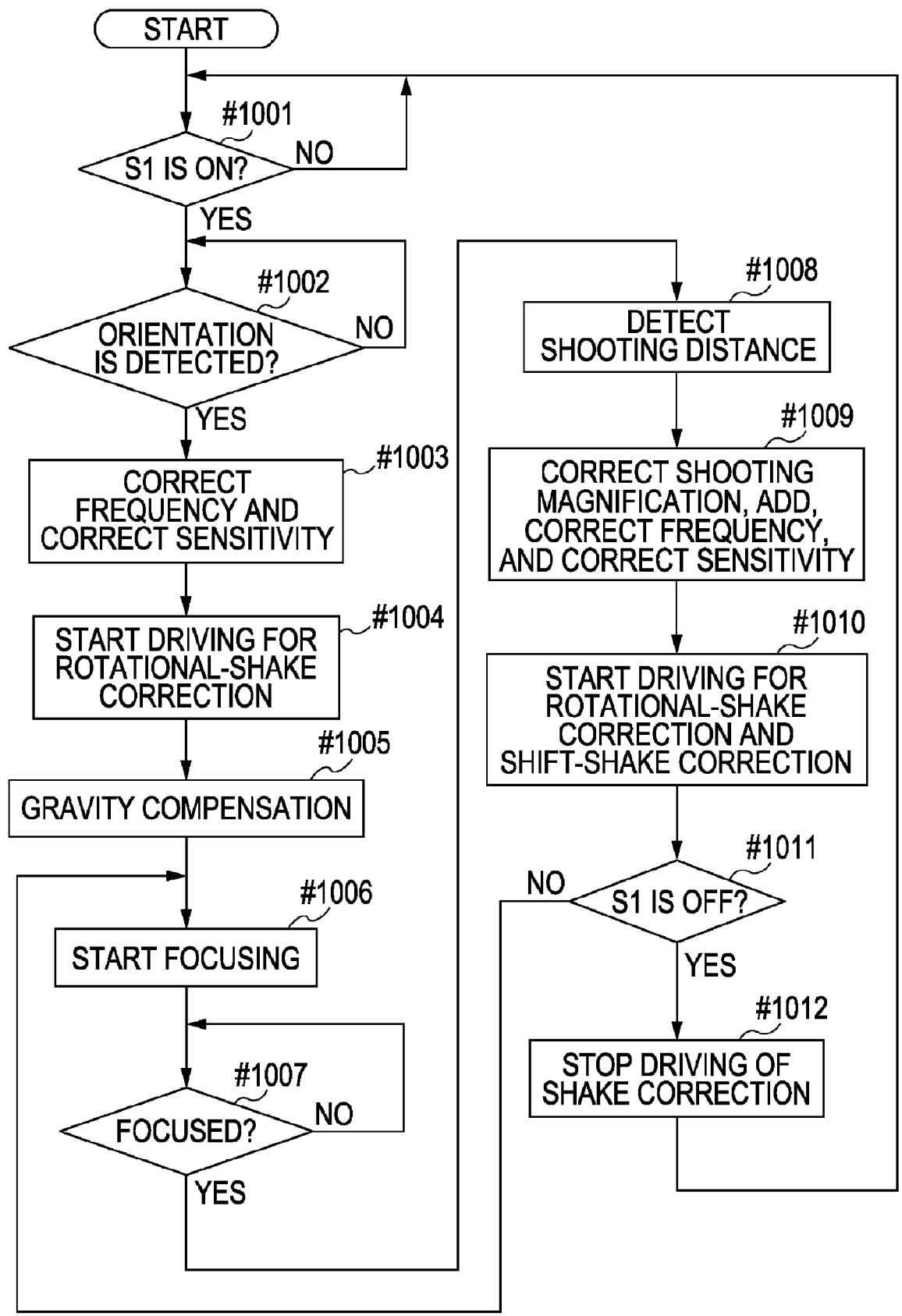
FIG. 5 is a flow chart of an operation for performing image-shake correction in the single-lens reflex camera according to the first embodiment of the present invention.

FIG. 5 is a flow chart of an operation for performing image-shake correction according to the first embodiment of the present invention. This operation starts when the main power switch of the camera is turned on. In order to simplify the description of the first embodiment, the descriptions for various control steps in the camera (such as battery checking, photometry, ranging, lens driving for auto-focusing, and charging of the strobe) have been omitted. Furthermore, the description of the operation below is directed to an example where the rotational shake 82$p$ and the shift shake 11$pb$ of the camera are respectively detected by the angular velocity meter 86$p$ and the accelerometer 11$p$. The same operation applies to a case where the rotational shake 82$y$ and the shift shake 11$yb$ of the camera are respectively detected by the angular velocity meter 86$y$ and the accelerometer 11$y$, and therefore, the description thereof will be omitted.

Referring to FIG. 5, in step 1001, the switch S1 waits until it is turned on by half-pressing of the release member 83$a$. When the release member 83$a$ is half-pressed and the switch S1 is turned on, the operation proceeds to step 1002. In step 1002, the initial-orientation-direction detecting circuit 23$p$ detects (determines) the orientation of the camera on the basis of a signal from the accelerometer 11$p$.

The detection for the orientation of the camera will now be described. First, the gravitational acceleration superimposed on each of the accelerometers 11$p$ and 11$y$ is detected. When the camera is held horizontally as in FIGS. 1A and 1B, the accelerometer 11$p$ outputs 1 G and the accelerometer 11$y$ outputs 0 G. If the camera is held vertically from this state (that is, the camera is in a horizontal state but the framing is held vertically), the accelerometer 11$p$ outputs 0 G and the accelerometer 11$y$ outputs 1 G. When the camera is held facing upward or downward, the accelerometers 11$p$ and 11$y$ both output 0 G. Accordingly, the orientation of the camera can be detected from these output values. The reason for determining the orientation at the timing when the switch S1 is turned on is that there is only a little change in the orientation after the user has half-pressed the release member 83$a$. More specifically, the half-pressing of the release member 83$a$ is performed after the user has determined the framing of the camera and is therefore holding the camera stably.

In a case where the orientation is determined to be that shown in FIG. 1A or 1B on the basis of the signals from the accelerometers 11$p$ and 11$y$, the gravitational-effect calculating circuit 24$p$ performs gravity compensation on the output from the accelerometer 11$p$. In this case, however, gravity compensation is not performed on the output from the accelerometer 11$y$, and the compensation amount of an acceleration gravity compensation circuit 21$y$ is set to zero (since there is originally no change in the gravitational acceleration caused by rotational shake). Specifically, the acceleration gravity compensation circuit 21$y$, although not shown, has a similar function to that of the acceleration gravity compensation circuit 21$p$ and is provided for compensating for a gravitational effect on the accelerometer 11$y$. In the above-described case, the acceleration gravity compensation circuit 21$y$ does not perform compensation on a gravity component with respect to the output from the accelerometer 11$y$.

On the other hand, when the camera is held vertically (accelerometer 11$p$: 0 G and accelerometer 11$y$: 1 G), gravity compensation for the accelerometer 11$y$ is performed on the basis of a signal from the angular velocity meter 86$y$. However, gravity compensation for the accelerometer 11$p$ based on a signal from the angular velocity meter 86$p$ is not implemented.

In the gravitational-effect calculating circuit 24$p$, the compensation amount of the acceleration gravity compensation circuit 21$p$ is set to zero. If the camera is held facing downward or upward (accelerometer 11$p$: ±1 G and accelerometer 11$y$: ±1 G), gravity compensation for the accelerometer 11$p$ is performed on the basis of a signal from the angular velocity meter 86$p$. In addition, gravity compensation for the accelerometer 11$y$ is performed on the basis of a signal from the angular velocity meter 86$y$.

As described above, the determination for performing gravity compensation depends on the orientation of the camera. In addition to gravitational acceleration, the signals from the accelerometers 11p and 11y have superimposed thereon acceleration due to shift shake. Thus, the signals from the accelerometers 11p and 11y are averaged for a predetermined time period (for example, 1 second) so that only the gravity components are extracted therefrom.

When the orientation has been detected as in the above-described manner, the operation proceeds to step 1003. In step 1003, the sensitivity is corrected in correspondence with the condition of the lens with respect to a shake angle signal, and the frequency is corrected in correspondence with the shake condition (such as panning). In step 1004, shake correction is performed on the basis of the shake angle signal. In this case, the correction is intended only for rotational shake, and the correction for shift shake is not yet performed. In step 1005, the gravitational-effect calculating circuit 24p calculates the gravitational acceleration superimposed on the accelerometer 11p on the basis of the orientation of the camera detected by the initial-orientation-direction detecting circuit 23p and the shake angle information from the angular-velocity integration circuit 13p. The acceleration gravity compensation circuit 21p compensates for the error in the output of the gravitational acceleration.

In step 1006, a focusing operation is started. In step 1007, the operation waits until the extension of the lens for the focusing is completed. Specifically, the in-focus detection circuit 27 detects the focus condition of the object through the focusing detection circuit 32, and the lens driving arithmetic circuit 33 calculates the extension amount of the focus lens. Subsequently, after the focus driver 34 drives the focus lens 35, the operation waits until the focusing detection circuit 32 reconfirms that the camera is focused on the object.

In step 1008, at the point when the lens extension is completed in step 1007, the extension amount of the lens is read with a focus encoder so as to detect the shooting distance (object distance). In step 1009, the focal length information of the lens is detected with a zoom encoder serving as the focal-length detector 18, and the shooting magnification is calculated at the shooting-magnification arithmetic circuit 26p on the basis of the relationship between the focal length information and the shooting distance detected in step 1008. The image-magnification correction circuit 25p then changes the gain of a shake displacement signal of the acceleration integration circuit 22p on the basis of the calculated result at the shooting-magnification arithmetic circuit 26p. The adding circuit 14p adds the shake displacement signal to the shake angle signal obtained from the angular-velocity integration circuit 13p, and the frequency-characteristic changing circuit 15p changes the shake-correction frequency band in accordance with the photographing condition. Then, the sensitivity changing circuit 16p changes the gain of a subsequent output signal on the basis of the vibration control sensitivity determined from the focal-length detector 18 and the shooting-distance detector 19 so as to calculate a target shake-correction value.

In step 1010, the shake correcting mechanism 85 is driven in accordance with the target shake-correction value determined in step 1009 so as to perform shake correction. Accordingly, this is the first step where shake correction for reducing both rotational shake and shift shake is implemented.

In step 1011, it is detected whether the switch S1 is turned off. If the switch S1 is off, the operation proceeds to step 1012, whereas if the switch S1 continues to be turned on, the operation returns to step 1006. In other words, as long as the switch S1 continues to be turned on, the shake correction is continuously performed while the gain of the target shake-correction value is changed in accordance with the image magnification and the sensitivity that change with the shooting distance (object distance). However, during that time, it is assumed that there is no change in the orientation of the accelerometer 11p for gravity compensation. When the lens is in an in-focus state, the focusing operation of the lens is not performed, and the operation proceeds to step 1008. On the other hand, when the in-focus state is not detected (such as when the object moves its position), the lens is driven for focusing in step 1007. In step 1008, the shooting distance is redetected so that the shooting magnification is changed.

When it is determined that the switch S1 is off in step 1011, the operation proceeds to step 1012 where the driving of the shake correcting mechanism 85 is stopped. The operation then returns to step 1001 and waits until the switch S1 is operated again.

In the first embodiment, the shake correction process involves correcting only the rotational shake at the initial stage, and then correcting both the rotational shake and the shift shake at the subsequent stage. Because the rotational shake is corrected at the initial stage of the shake correction process, the focus precision can be increased, and information (shooting magnification) used for correcting the shift shake can be properly obtained. In addition, since at least the rotational shake is corrected at an early stage, a user-friendly image stabilizing system can be achieved.

More specifically, the system includes the angular velocity meters 86p and 86y, which are examples of rotational-shake detectors, the accelerometers 11p and 11y, which are examples of shift-shake detectors, and the shake correcting mechanism 85 for reducing image deterioration caused by rotational shake and shift shake. At the initial stage of the shake correction process, the shake correcting mechanism 85 is actuated on the basis of the output signals from the angular velocity meters 86p and 86y (step 1004 in FIG. 5). After focusing, the shake correcting mechanism 85 is actuated on the basis of the output signals from the angular velocity meters 86p and 86y and the output signals from the accelerometers 11p and 11y (step 1010 in FIG. 5).

As described above, only the rotational shake is subject to correction at the initial stage of the shake correction process, and both the rotational shake and the shift shake are corrected at the subsequent stage of the shake correction process. Although this implies that an image stabilizing effect against the shift shake is not attained at the initial stage of the shake correction process, the rotational shake is sufficiently corrected at the initial stage for effectively preventing the focus precision from being deteriorated due to hand motion. In other words, the focusing operation can be performed with high precision. Accordingly, the shift shake correction can be performed with high precision on the basis of highly accurate shooting magnification information obtained as a result of the high focus precision.

Second Embodiment

A single-lens reflex camera according to a second embodiment of the present invention will now be described. The second embodiment differs from the first embodiment in FIG. 5 in that the rotational shake correction is started upon half-pressing of the release member 83a, that is, when the switch S1 is turned on, and that the shift shake correction is performed in an exposure process (when the release member 83a is fully pressed, that is, when a switch S2 is turned on). Other mechanical and electrical configurations of the camera in the second embodiment are the same as those in the first embodiment.

Figure 6:
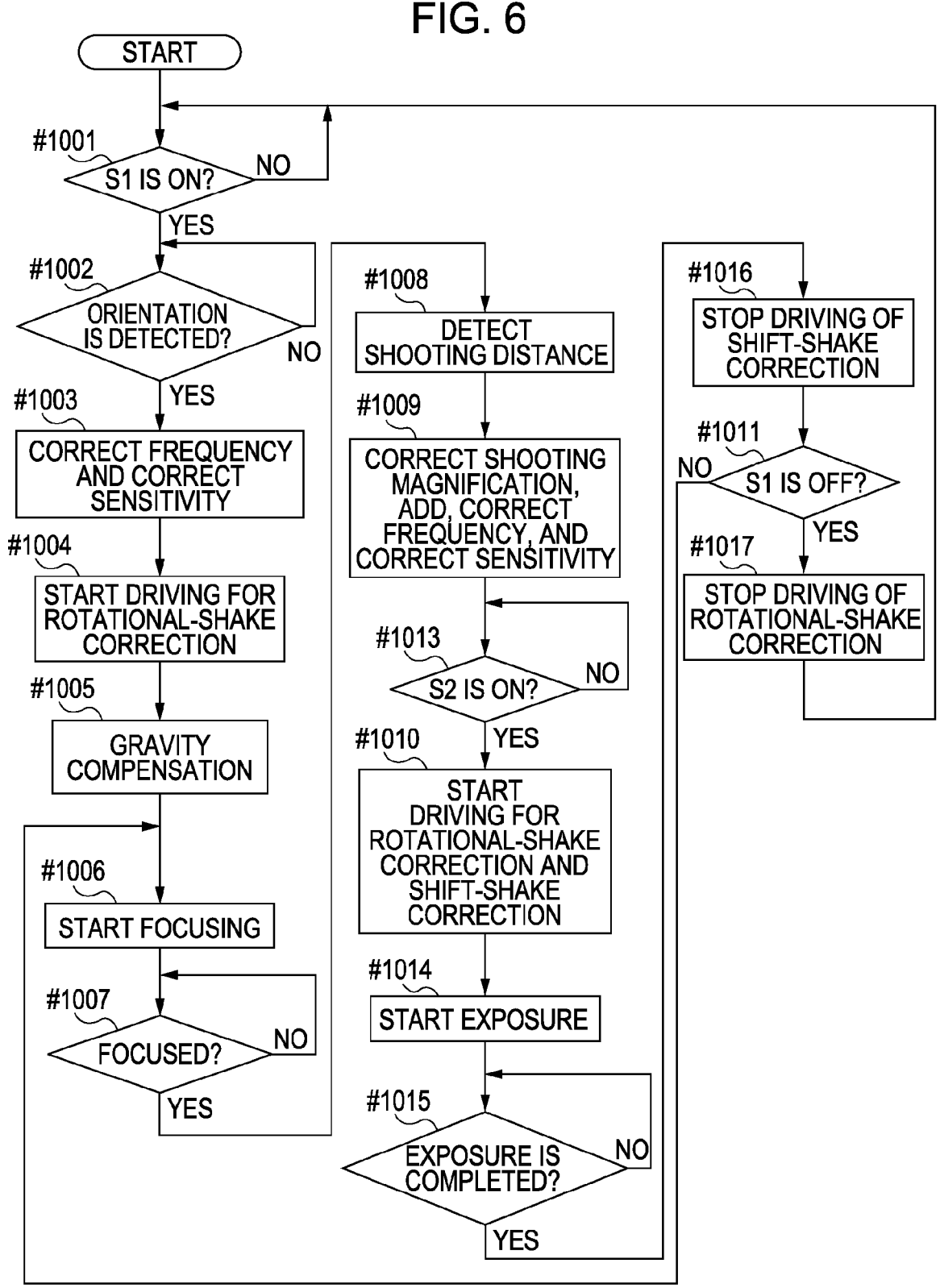
FIG. 6 is a flow chart of an operation for performing image-shake correction in a single-lens reflex camera according to a second embodiment of the present invention.

FIG. 6 is a flow chart of an operation for performing image-shake correction according to the second embodiment of the present invention. This operation starts when the main power switch of the camera is turned on. The steps performed in this operation that correspond to those in the operation of the first embodiment shown in FIG. 5 are given the same step numbers. Similar to the above description of the first embodiment, the description of the operation according to the second embodiment below is directed to an example where the rotational shake 82$p$ and the shift shake 11$pb$ of the camera are respectively detected by the angular velocity meter 86$p$ and the accelerometer 11$p$. The same operation as shown in FIG. 6 is performed with respect to the rotational shake 82$y$ and the shift shake 11$yb$ of the camera, and therefore, the description thereof will be omitted.

In step 1001, the switch S1 waits until it is turned on. When the switch S1 is turned on, the operation proceeds to step 1002 where, as in the first embodiment, the initial-orientation-direction detecting circuit 23$p$ detects the orientation of the camera on the basis of a signal from the accelerometer 11$p$. In step 1003, the sensitivity is corrected in correspondence with the condition of the lens with respect to a shake angle signal, and the frequency is corrected in correspondence with the shake condition (such as panning). In step 1004, shake correction (rotational shake correction) is performed on the basis of the shake angle signal.

In step 1005, the gravitational-effect calculating circuit 24$p$ calculates the gravitational acceleration superimposed on the accelerometer 11$p$ on the basis of the orientation of the camera detected by the initial-orientation-direction detecting circuit 23$p$ and the shake angle information from the angular-velocity integration circuit 13$p$. The acceleration gravity compensation circuit 21$p$ compensates for the error in the output of the gravitational acceleration. In step 1006, a focusing operation is started. In step 1007, the operation waits until the extension of the lens for the focusing is completed (until the lens is in an in-focus state). In step 1008, at the point when the lens extension is completed, the extension amount of the lens is read with the focus encoder so as to detect the shooting distance (object distance).

In step 1009, the focal length information of the lens is detected with the zoom encoder serving as the focal-length detector 18, and the shooting magnification is calculated at the shooting-magnification arithmetic circuit 26$p$ on the basis of the relationship between the focal length information and the shooting distance detected in step 1008. The image-magnification correction circuit 25$p$ then changes the gain of a shake displacement signal of the acceleration integration circuit 22$p$ on the basis of the calculated result at the shooting-magnification arithmetic circuit 26$p$. The adding circuit 14$p$ adds the shake displacement signal to the shake angle signal obtained from the angular-velocity integration circuit 13$p$, and the frequency-characteristic changing circuit 15$p$ changes the shake-correction frequency band in accordance with the photographing condition. Then, the sensitivity changing circuit 16$p$ changes the gain of a subsequent output signal on the basis of the vibration control sensitivity determined from the focal-length detector 18 and the shooting-distance detector 19 so as to calculate a target shake-correction value.

In step 1013, the operation is on standby until the switch S2 is turned on for exposure. Although not shown in FIG. 6, if the switch S1 is released during this standby mode, the operation proceeds to step 1017. When the switch S2 is turned on, the operation proceeds to step 1010 where the shake correcting mechanism 85 is driven in accordance with the target shake-correction value so as to perform shake correction. This is the first step where both the rotational shake and the shift shake are corrected.

In step 1014, an exposure process is started. In step 1015, the operation waits until the exposure process is completed. When the exposure process is completed, the operation proceeds to step 1016 where the correction process for only the shift shake is stopped (the correction process for the rotational shake still continues). In step 1011, it is detected whether the switch S1 is turned off. If the switch S1 is off, the operation proceeds to step 1017, whereas if the switch S1 continues to be turned on, the operation returns to step 1006. In other words, as long as the switch S1 continues to be turned on, the rotational shake correction is continuously performed while the gain of the target shake-correction value is changed in accordance with the image magnification and the sensitivity that change with the shooting distance (object distance). However, during that time, it is assumed that there is no change in the orientation of the accelerometer 11$p$ for gravity compensation. When the lens is in an in-focus state, the focusing operation of the lens is not performed, and the operation proceeds to step 1008. On the other hand, when the in-focus state is not detected (such as when the object moves its position), the lens is driven for focusing in step 1007. In step 1008, the shooting distance is redetected so that the shooting magnification is changed.

When it is determined that the switch S1 is off in step 1011, the operation proceeds to step 1017 where the driving of the shake correcting mechanism 85 is stopped to terminate the rotational shake correction. The operation then returns to step 1001 and waits until the switch S1 is operated again.

Accordingly, in the second embodiment, a shake correction process for only the rotational shake is first performed when the switch S1 is turned on (step 1004 in FIG. 6), and the rotational shake and the shift shake are both subsequently corrected after the switch S2 is turned on (step 1010). However, the shake correction process may be implemented without relation to the pressing of the release member 83$a$. For example, the rotational shake correction may be started in response to photographic preparation processes, such as photometry and ranging processes, and the shift shake correction may be performed in response to an operation performed for an exposure process, such as a shutter-operation start signal. In other words, only the correction process for only the rotational shake may be implemented at the photographic preparation stage, and the correction processes for the rotational shake and the shift shake may be implemented at the time of an operation for an exposure process (i.e. a process for capturing an image), which is performed in response to an instruction for a photographing operation.

Accordingly, similar to the first embodiment, the focus precision can be increased, and information (shooting magnification) used for correcting the shift shake can be properly obtained. In addition, since at least the rotational shake is corrected at an early stage, a user-friendly image stabilizing system can be achieved. Because the focusing operation can be performed with high precision, the shift shake correction can be performed with high precision on the basis of highly accurate shooting magnification information obtained as a result of the high focus precision.

Third Embodiment

A single-lens reflex camera according to a third embodiment of the present invention will now be described. The third embodiment differs from the second embodiment in that the rotational shake correction is started when the main power switch of the camera is turned on (that is, in response to activation of the camera), and that the shift shake correction is performed upon half-pressing of the release member 83a, that is, when the switch S1 is turned on. Other mechanical and electrical configurations of the camera in the third embodiment are the same as those in the first and second embodiments.

Figure 7:
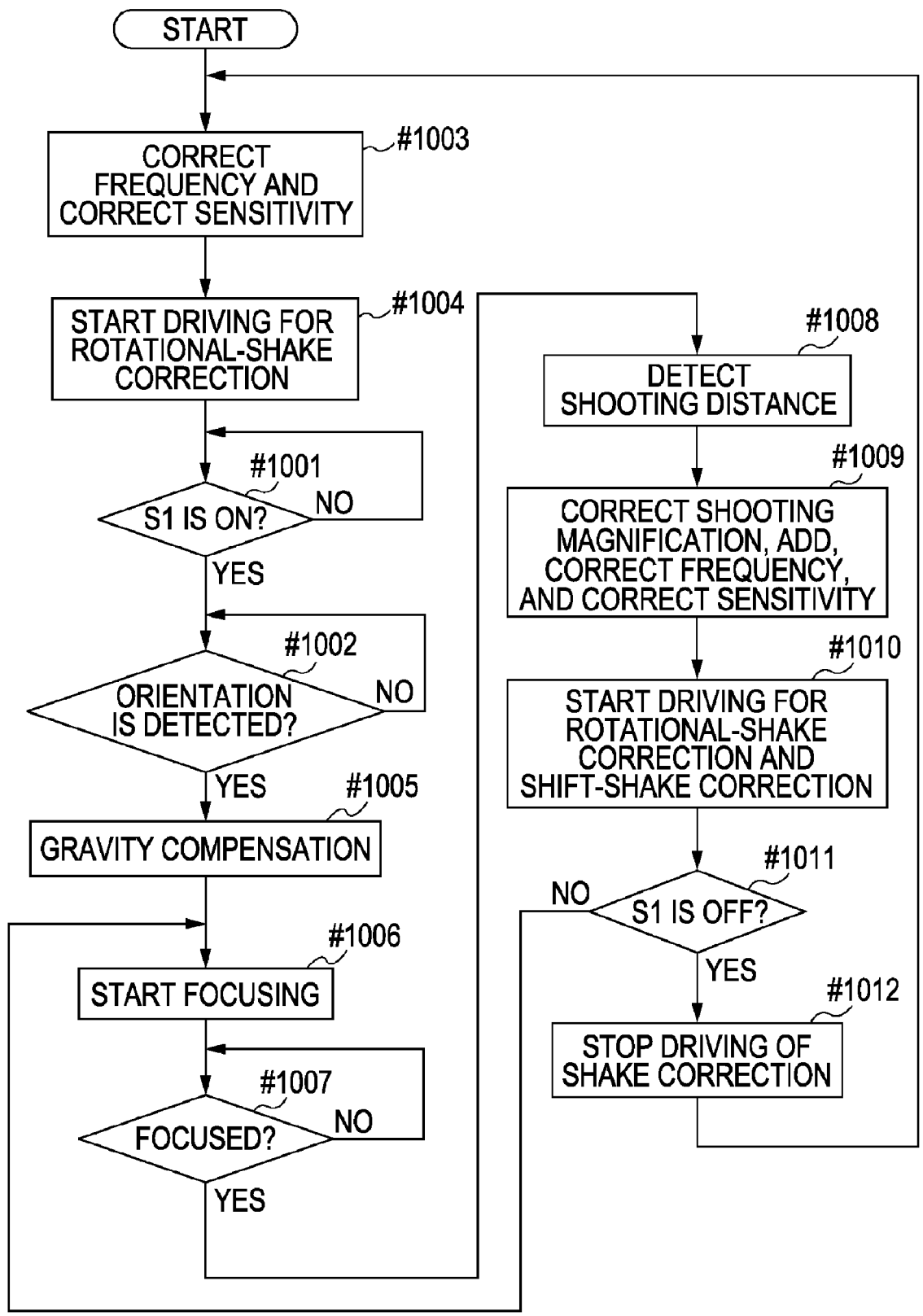
FIG. 7 is a flow chart of an operation for performing image-shake correction in a single-lens reflex camera according to a third embodiment of the present invention.

FIG. 7 is a flow chart of an operation for performing image-shake correction according to the third embodiment of the present invention. This operation starts when the main power switch of the camera is turned on. The steps performed in this operation that correspond to those in the operations of the first and second embodiments shown in FIGS. 5 and 6 are given the same step numbers.

After the main power switch of the camera is turned on, the operation starts from step 1003. In step 1003, the sensitivity is corrected in correspondence with the condition of the lens with respect to a shake angle signal, and the frequency is corrected in correspondence with the shake condition (such as panning). In step 1004, shake correction (rotational shake correction) is performed on the basis of the shake angle signal. In other words, the rotational shake correction is performed when the camera is activated.

In step 1001, the operation waits for the release member 83a to be half-pressed, that is, the switch S1 to be turned on. When the switch S1 is turned on, the operation proceeds to step 1002.

In step 1002, the initial-orientation-direction detecting circuit 23p detects the orientation of the camera on the basis of a signal from the accelerometer 11p. In step 1005, the gravitational-effect calculating circuit 24p calculates the gravitational acceleration superimposed on the accelerometer 11p on the basis of the orientation of the camera detected by the initial-orientation-direction detecting circuit 23p and the shake angle information from the angular-velocity integration circuit 13p. The acceleration gravity compensation circuit 21p compensates for the error in the output of the gravitational acceleration. In step 1006, a focusing operation is started. In step 1007, the operation waits until the extension of the lens for the focusing is completed, that is, until the lens is in an in-focus state. In step 1008, at the point when the in-focus state is attained, the extension amount of the lens is read with the focus encoder so as to detect the shooting distance (object distance).

In step 1009, the focal length information of the lens is detected with the zoom encoder serving as the focal-length detector 18, and the shooting magnification is calculated at the shooting-magnification arithmetic circuit 26p on the basis of the relationship between the focal length information and the shooting distance detected in step 1008. The image-magnification correction circuit 25p then changes the gain of a shake displacement signal of the acceleration integration circuit 22p on the basis of the calculated result at the shooting-magnification arithmetic circuit 26p. The adding circuit 14p adds the shake displacement signal to the shake angle signal obtained from the angular-velocity integration circuit 13p, and the frequency-characteristic changing circuit 15p changes the shake-correction frequency band in accordance with the photographing condition. Then, the sensitivity changing circuit 16p changes the gain of a subsequent output signal on the basis of the vibration control sensitivity determined from the focal-length detector 18 and the shooting-distance detector 19 so as to calculate a target shake-correction value.

In step 1010, the shake correcting mechanism 85 is driven in accordance with the target shake-correction value so as to perform shake correction. Specifically, when the release member 83a is half-pressed, that is, when the switch S1 is turned on, the shake correction processes for both the rotational shake and the shift shake are implemented for the first time.

In step 1011, if the half-pressing of the release member 83a is released, that is, if the switch S1 is turned off, the operation proceeds to step 1012. On the other hand, if the switch S1 continues to be turned on, the operation returns to step 1006. In other words, as long as the switch S1 continues to be turned on, the rotational shake correction and the shift shake correction are continuously performed while the gain of the target shake-correction value is changed in accordance with the image magnification and the sensitivity that change with the shooting distance (object distance). During that time, it is assumed that there is no change in the orientation of the accelerometer 11p for gravity compensation.

When the lens is in an in-focus state, the focusing operation of the lens is not performed, and the operation proceeds to step 1008. On the other hand, when the in-focus state is not detected (such as when the object moves its position), the lens is driven for focusing in step 1007. In step 1008, the shooting distance is redetected so that the shooting magnification is changed.

When it is determined that the switch S1 is off in step 1011, the operation proceeds to step 1012 where the driving of the shake correcting mechanism 85 is stopped to terminate the rotational shake correction and the shift shake correction. The operation then returns to step 1001 and waits until the switch S1 is operated again.

Accordingly, in the third embodiment, a shake correction process for only the rotational shake is first performed at the time of the activation of the camera (step 1004 in FIG. 7), and the rotational shake and the shift shake are both subsequently corrected (step 1010) after the photographic preparation processes (i.e. after the switch S1 is turned on). However, the shake correction process may be implemented without relation to the turning on of the switch S1 (the pressing of the release member 83a). For example, the shift shake correction may be started in response to photographic preparation processes, such as photometry and ranging processes.

According to the third embodiment, the shake correction process involves correcting only the rotational shake at the initial stage (i.e. at the time of activation of the camera), and then correcting both the rotational shake and the shift shake at the subsequent stage (when the in-focus state is attained after the switch S1 is turned on). Since the rotational shake correction is implemented before the focusing operation, the focus precision can be increased, and information (shooting magnification) used for correcting the shift shake can be properly obtained. In addition, since at least the rotational shake is corrected at an early stage, a user-friendly image stabilizing system can be achieved. Because the focusing operation can be performed with high precision, the shift shake correction can be performed with high precision on the basis of highly accurate shooting magnification information obtained as a result of the high focus precision.

Fourth Embodiment

A single-lens reflex camera according to a fourth embodiment of the present invention will now be described. The fourth embodiment differs from the third embodiment in that the effect of shift shake correction is reduced at the start of the shift shake correction process and is gradually increased with time (i.e. a satisfactory effect of shift shake correction is attained after a predetermined time period). Other mechanical and electrical configurations of the camera in the fourth embodiment are the same as those in the first to third embodiments.

As described above, the detection of shift shake is achieved by second-order integrating the shift-shake acceleration values detected at the accelerometers 11p and 11y to convert the values to shift-shake displacement signals. However, until the second-order integration becomes stable, there are cases where the shift-shake displacement signals fluctuate significantly. Such significant fluctuation can cause the shake correcting mechanism 85 to use up its correction stroke or cause the user to experience nausea that is somewhat similar to seasickness.

Therefore, in the fourth embodiment, the drive sensitivity of the shake correcting mechanism 85 at the start of the shift shake correction process is reduced (i.e. the driving amount of the shake correcting mechanism 85 is reduced with respect to shift shake displacement). Subsequently, the drive sensitivity is gradually increased towards 1 (the shift shake displacement signal is stable by the time the drive sensitivity of shift shake reaches a sufficient level).

Figure 8:
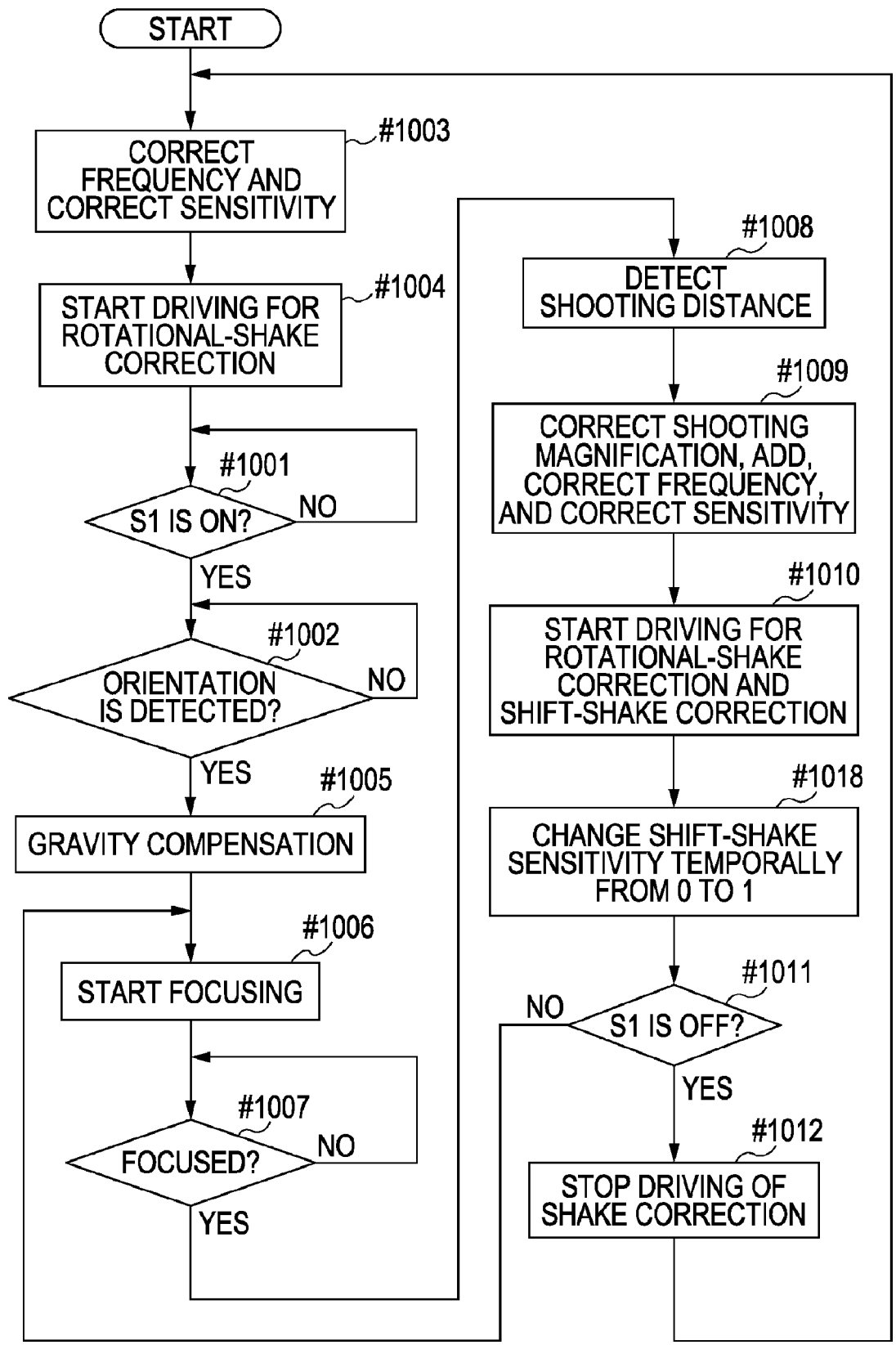
FIG. 8 is a flow chart of an operation for performing image-shake correction in a single-lens reflex camera according to a fourth embodiment of the present invention.

FIG. 8 is a flow chart of an operation for performing image-shake correction according to the fourth embodiment of the present invention. This operation starts when the main power switch of the camera is turned on. The steps performed in this operation that correspond to those in the operations of the first to third embodiments shown in FIGS. 5 to 7 are given the same step numbers.

After the main power switch of the camera is turned on, the operation starts from step 1003. In step 1003, the sensitivity is corrected in correspondence with the condition of the lens with respect to a shake angle signal, and the frequency is corrected in correspondence with the shake condition (such as panning). In step 1004, shake correction (rotational shake correction) is performed on the basis of the shake angle signal. In other words, the rotational shake correction is performed when the camera is activated.

In step 1001, the operation waits for the release member 83a to be half-pressed, that is, the switch S1 to be turned on. When the switch S1 is turned on, the operation proceeds to step 1002. In step 1002, the initial-orientation-direction detecting circuit 23p detects the orientation of the camera on the basis of a signal from the accelerometer 11p. In step 1005, the gravitational-effect calculating circuit 24p calculates the gravitational acceleration superimposed on the accelerometer 11p on the basis of the orientation of the camera detected by the initial-orientation-direction detecting circuit 23p and the shake angle information from the angular-velocity integration circuit 13p. The acceleration gravity compensation circuit 21p compensates for the error in the output of the gravitational acceleration. In step 1006, a focusing operation is started. In step 1007, the operation waits until the extension of the lens for the focusing is completed, that is, until the lens is in an in-focus state. In step 1008, at the point when the in-focus state is attained, the extension amount of the lens is read with the focus encoder so as to detect the shooting distance (object distance).

In step 1009, the focal length information of the lens is detected with the zoom encoder serving as the focal-length detector 18, and the shooting magnification is calculated at the shooting-magnification arithmetic circuit 26p on the basis of the relationship between the focal length information and the shooting distance detected in step 1008. The image-magnification correction circuit 25p then changes the gain of a shake displacement signal of the acceleration integration circuit 22p on the basis of the calculated result at the shooting-magnification arithmetic circuit 26p. The adding circuit 14p adds the shake displacement signal to the shake angle signal obtained from the angular-velocity integration circuit 13p, and the frequency-characteristic changing circuit 15p changes the shake-correction frequency band in accordance with the photographing condition. Then, the sensitivity changing circuit 16p changes the gain of a subsequent output signal on the basis of the vibration control sensitivity determined from the focal-length detector 18 and the shooting-distance detector 19 so as to calculate a target shake-correction value. However, the adding circuit 14p sets the proportion of the signal of the acceleration integration circuit 22p received from the image-magnification correction circuit 25p to zero with respect to the output signal from the angular-velocity integration circuit 13p. In other words, the shift shake displacement signal at this time is zero.

In step 1010, the shake correcting mechanism 85 is driven in accordance with the target shake-correction value so as to perform shake correction. Specifically, when the release member 83a is half-pressed, that is, when the switch S1 is turned on, the shake correction processes for both the rotational shake and the shift shake are implemented for the first time.

In step 1018, the ratio between the shift-shake displacement signal and the shake angle signal is gradually changed to an appropriate value (i.e. a ratio determined by the image-magnification correction circuit 25p) with time (for example, 1 second). Therefore, a satisfactory shift shake correction can be achieved after, for example, 1 second.

In step 1011, if the half-pressing of the release member 83a is released, that is, if the switch S1 is turned off, the operation proceeds to step 1012. On the other hand, if the switch S1 continues to be turned on, the operation returns to step 1006. In other words, as long as the switch S1 continues to be turned on, the rotational shake correction is continuously performed while the gain of the target shake-correction value is changed in accordance with the image magnification and the sensitivity that change with the shooting distance (object distance). During that time, it is assumed that there is no change in the orientation of the accelerometer 11p for gravity compensation.

When the lens is in an in-focus state, the focusing operation of the lens is not performed, and the operation proceeds to step 1008. On the other hand, when the in-focus state is not detected (such as when the object moves its position), the lens is driven for focusing in step 1007. In step 1008, the shooting distance is redetected so that the shooting magnification is changed.

When it is determined that the switch S1 is off in step 1011, the operation proceeds to step 1012 where the driving of the shake correcting mechanism 85 is stopped to terminate the rotational shake correction and the shift shake correction. The operation then returns to step 1001 and waits until the switch S1 is operated again.

Accordingly, in the fourth embodiment, the shake correction process involves correcting only the rotational shake at the initial stage (steps 1004 and 1010 in FIG. 8), and then correcting also the shift shake at the subsequent stage (step 1018) in accordance with time. Consequently, this prevents the unstableness of the shift shake displacement signal at the initial stage from affecting the shake correcting mechanism 85 (used-up stroke) and from having an adverse effect (nausea) on the user.

In the first to fourth embodiments described above, an image stabilizing system of a camera (image pickup apparatus) has been described as an example of a countermeasure against shift shake. However, the system according to the present invention can be packaged into a compact and highly stable mechanism, and is therefore, not limited to a camera of the aforementioned type. For example, the system according to the present invention is applicable to, for example, digital video camcorders, monitoring cameras, web cameras, and portable telephones.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2006-249861 filed Sep. 14, 2006, which is hereby incorporated by reference herein in its entirety.

What is claimed is:

1. An image stabilizing system comprising:
    a rotational-shake detecting unit configured to detect rotational shake occurring in an optical apparatus;
    a parallel-shake detecting unit configured to detect parallel shake occurring in the optical apparatus, the parallel shake occurring in a direction perpendicular to a light axis;
    a shake correcting unit configured to reduce image deterioration caused by the rotational shake and the parallel shake; and
    an image stabilizing unit configured to actuate the shake correcting unit at an initial stage of a shake correcting process on the basis of an output signal from the rotational-shake detecting unit, and to actuate the shake correcting unit at a subsequent stage of the shake correcting process on the basis of the output signal from the rotational-shake detecting unit and an output signal from the parallel-shake detecting unit.

2. The image stabilizing system according to claim 1, wherein the image stabilizing unit actuates the shake correcting unit on the basis of the output signal from the rotational-shake detecting unit while a focusing operation is being performed by a focusing unit included in the optical apparatus, and actuates the shake correcting unit on the basis of the output signals from the rotational-shake detecting unit and the parallel-shake detecting unit after the focusing operation is completed.

3. The image stabilizing system according to claim 1, wherein if the optical apparatus has an image capturing function, the image stabilizing unit actuates the shake correcting unit on the basis of the output signal from the rotational-shake detecting unit when the optical apparatus is in a preparation state for an image capturing operation, and actuates the shake correcting unit on the basis of the output signals from the rotational-shake detecting unit and the parallel-shake detecting unit at the time of an exposure process performed in response to an instruction for the image capturing operation in the optical apparatus.

4. An optical apparatus comprising the image stabilizing system according to claim 1.

5. An image stabilizing system comprising:
    a rotational-shake detecting unit configured to detect rotational shake occurring in an optical apparatus;
    a parallel-shake detecting unit configured to detect parallel shake occurring in the optical apparatus, the parallel shake occurring in a direction perpendicular to a light axis;
    a shake correcting unit configured to reduce image deterioration caused by the rotational shake and the parallel shake; and
    an image stabilizing unit configured to control a mixing ratio between an output signal from the rotational-shake detecting unit and an output signal from the parallel-shake detecting unit in accordance with elapsed time after a start of a shake correcting process when the image stabilizing unit actuates the shake correcting unit to perform the shake correcting process on the basis of the output signals from the rotational-shake detecting unit and the parallel-shake detecting unit.

6. The image stabilizing system according to claim 5, wherein the image stabilizing unit allows a proportion of the output signal from the parallel-shake detecting unit in the mixing ratio to be lower for an initial stage of the shake correcting process than for a stage subsequent to the initial stage of the shake correcting process.

7. The image stabilizing system according to claim 5, wherein the image stabilizing unit starts counting the elapsed time after completion of a focusing operation performed by a focusing unit included in the optical apparatus.

8. An optical apparatus comprising the image stabilizing system according to claim 5.

9. An image stabilizing system comprising:
    a rotational-shake detecting unit configured to detect rotational shake occurring in an optical apparatus;
    a parallel-shake detecting unit configured to detect parallel shake occurring in the optical apparatus, the parallel shake occurring in a direction perpendicular to a light axis;
    a shake correcting unit configured to reduce image deterioration caused by the rotational shake and the parallel shake; and
    an image stabilizing unit configured to actuate the shake correcting unit on the basis of an output signal from the rotational-shake detecting unit after starting a shake correcting process, and then actuate the shake correcting unit on the basis of the output signal from the rotational-shake detecting unit and an output signal from the parallel-shake detecting unit.

10. The image stabilizing system according to claim 9, wherein the image stabilizing unit actuates the shake correcting unit on the basis of the output signal from the rotational-shake detecting unit while a focusing operation is being performed by a focusing unit included in the optical apparatus, and actuates the shake correcting unit on the basis of the output signals from the rotational-shake detecting unit and the parallel-shake detecting unit after the focusing operation is completed.

11. The image stabilizing system according to claim 9, wherein if the optical apparatus has an image capturing function, the image stabilizing unit actuates the shake correcting unit on the basis of the output signal from the rotational-shake detecting unit when the optical apparatus is in a preparation state for an image capturing operation, and actuates the shake correcting unit on the basis of the output signals from the rotational-shake detecting unit and the parallel-shake detecting unit at the time of an exposure process performed in response to an instruction for the image capturing operation in the optical apparatus.

12. An optical apparatus comprising the image stabilizing system according to claim 9.

* * * * *